United States Patent
Kameyama et al.

(10) Patent No.: US 9,911,518 B2
(45) Date of Patent: Mar. 6, 2018

(54) CATHODE ACTIVE MATERIAL FOR LITHIUM-ION BATTERY, CATHODE FOR LITHIUM-ION BATTERY AND LITHIUM-ION BATTERY

(71) Applicant: JX Nippon Mining & Metals Corporation, Chiyoda-ku, Tokyo (JP)

(72) Inventors: Tatsuya Kameyama, Kitaibaraki (JP); Tomoya Tamura, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 282 days.

(21) Appl. No.: 14/416,797

(22) PCT Filed: Sep. 30, 2013

(86) PCT No.: PCT/JP2013/076598
§ 371 (c)(1),
(2) Date: Jan. 23, 2015

(87) PCT Pub. No.: WO2014/051148
PCT Pub. Date: Apr. 3, 2014

(65) Prior Publication Data
US 2015/0188134 A1   Jul. 2, 2015

(30) Foreign Application Priority Data
Sep. 28, 2012   (JP) .................... 2012-218887

(51) Int. Cl.
*H01B 1/08* (2006.01)
*C01G 53/00* (2006.01)
(Continued)

(52) U.S. Cl.
CPC ............... *H01B 1/08* (2013.01); *C01G 53/42* (2013.01); *C01G 53/50* (2013.01); *H01M 4/505* (2013.01);
(Continued)

(58) Field of Classification Search
CPC ........ H01B 1/08; H01M 4/505; H01M 4/525; H01M 2004/021; C01G 53/42; C01G 53/50; C01P 2002/60; C01P 2002/77
See application file for complete search history.

(56) References Cited

U.S. PATENT DOCUMENTS

| 2,165,128 A | 7/1939 | Cheesman |
|---|---|---|
| 4,443,186 A | 4/1984 | Shell |

(Continued)

FOREIGN PATENT DOCUMENTS

| CN | 1520621 A | 8/2004 |
|---|---|---|
| CN | 1701451 A | 11/2005 |

(Continued)

OTHER PUBLICATIONS

Office Action dated Feb. 25, 2015 in co-pending U.S. Appl. No. 13/508,880.

(Continued)

*Primary Examiner* — Mark Kopec
*Assistant Examiner* — Matthew R Diaz
(74) *Attorney, Agent, or Firm* — Nields, Lemack & Frame, LLC (57) ABSTRACT

A cathode active material for lithium-ion battery is provided, which provides good battery characteristics such as cycle characteristics. The cathode active material for lithium-ion battery is expressed by the composition formula: $Li_xNi_{1-y}M_yO_\alpha$, wherein M is one or more selected from Ti, Cr, Mn, Fe, Co, Cu, Al, Sn, Mg and Zr; $0.9 \le x \le 1.2$; $0 < y \le 0.5$; and $2.0 \le \alpha \le 2.2$, wherein the crystallite size obtained by analyzing the XRD pattern is 870 Å or more and the unit lattice volume is 101.70 Å³ or less.

3 Claims, 2 Drawing Sheets

(51) Int. Cl.
*H01M 4/505* (2010.01)
*H01M 4/525* (2010.01)
*H01M 4/02* (2006.01)
*H01M 10/0525* (2010.01)

(52) U.S. Cl.
CPC ......... *H01M 4/525* (2013.01); *C01P 2002/60* (2013.01); *C01P 2002/77* (2013.01); *H01M 10/0525* (2013.01); *H01M 2004/021* (2013.01)

(56) References Cited

U.S. PATENT DOCUMENTS

| | | | |
|---|---|---|---|
| 4,462,793 A | 7/1984 | Maeda et al. | |
| 4,469,654 A | 9/1984 | Haskett et al. | |
| 5,393,622 A | 2/1995 | Nitta et al. | |
| 5,449,577 A | 9/1995 | Dahn et al. | |
| 5,478,674 A | 12/1995 | Miyasaka | |
| 5,759,714 A | 6/1998 | Matsufuji et al. | |
| 6,037,095 A | 3/2000 | Miyasaka | |
| 6,040,090 A * | 3/2000 | Sunagawa | H01M 4/131 429/223 |
| 6,123,911 A | 9/2000 | Yamaguchi et al. | |
| 6,423,447 B1 | 7/2002 | Ohsaki et al. | |
| 6,521,379 B2 * | 2/2003 | Nishida | H01M 4/131 429/231.3 |
| 6,582,854 B1 | 6/2003 | Qi et al. | |
| 6,919,144 B2 * | 7/2005 | Miyazaki | H01M 4/131 29/623.1 |
| 6,960,335 B1 * | 11/2005 | Singhal | B82Y 30/00 423/594.15 |
| 6,984,469 B2 | 1/2006 | Kweon et al. | |
| 7,332,248 B2 | 2/2008 | Kase et al. | |
| 7,410,728 B1 | 8/2008 | Fujimoto et al. | |
| 7,556,655 B2 * | 7/2009 | Dahn | C01G 53/006 29/623.1 |
| 7,645,542 B2 | 1/2010 | Kase et al. | |
| 7,799,458 B2 * | 9/2010 | Nishida | C01G 45/1242 429/231.3 |
| 7,935,443 B2 * | 5/2011 | Ohzuku | H01M 4/485 429/223 |
| 8,354,191 B2 | 1/2013 | Shizuka et al. | |
| 8,623,551 B2 | 1/2014 | Kawahashi et al. | |
| 8,748,041 B2 | 6/2014 | Satoh et al. | |
| 8,993,160 B2 | 3/2015 | Nagase | |
| 9,090,481 B2 | 7/2015 | Satoh | |
| 9,118,076 B2 | 8/2015 | Kajiya et al. | |
| 9,214,676 B2 | 12/2015 | Okamoto | |
| 9,216,913 B2 | 12/2015 | Okamoto et al. | |
| 9,221,693 B2 | 12/2015 | Kawahashi et al. | |
| 9,224,514 B2 | 12/2015 | Okamoto | |
| 9,224,515 B2 | 12/2015 | Okamoto | |
| 9,225,020 B2 | 12/2015 | Okamoto et al. | |
| 9,231,249 B2 | 1/2016 | Kajiya et al. | |
| 9,240,594 B2 | 1/2016 | Okamoto et al. | |
| 9,263,732 B2 | 2/2016 | Nagase et al. | |
| 9,327,996 B2 | 5/2016 | Kawahashi et al. | |
| 2002/0106561 A1 | 8/2002 | Lee et al. | |
| 2002/0168570 A1 * | 11/2002 | Hampden-Smith | B01J 13/02 429/218.1 |
| 2003/0082448 A1 | 5/2003 | Cho et al. | |
| 2003/0104279 A1 | 6/2003 | Miyazaki et al. | |
| 2003/0126803 A1 | 7/2003 | Rosenflanz | |
| 2003/0211391 A1 | 11/2003 | Cho et al. | |
| 2004/0053134 A1 | 3/2004 | Ozaki et al. | |
| 2004/0110063 A1 | 6/2004 | Uchitomi et al. | |
| 2004/0126660 A1 * | 7/2004 | Ohzuku | H01M 4/505 429/223 |
| 2004/0197658 A1 | 10/2004 | Kase et al. | |
| 2005/0079416 A1 | 4/2005 | Ohzuku et al. | |
| 2005/0142442 A1 | 6/2005 | Yuasa et al. | |
| 2005/0158546 A1 | 7/2005 | Shizuka | |
| 2006/0083989 A1 | 4/2006 | Suhara et al. | |
| 2006/0121350 A1 | 6/2006 | Kajiya et al. | |
| 2006/0127765 A1 | 6/2006 | Machida et al. | |
| 2006/0204849 A1 | 9/2006 | Saito et al. | |
| 2006/0233696 A1 | 10/2006 | Paulsen et al. | |
| 2006/0281005 A1 | 12/2006 | Cho et al. | |
| 2007/0015058 A1 | 1/2007 | Takezawa et al. | |
| 2007/0141469 A1 | 6/2007 | Tokunaga et al. | |
| 2007/0202405 A1 | 8/2007 | Shizuka et al. | |
| 2007/0248883 A1 | 10/2007 | Oda et al. | |
| 2007/0298512 A1 | 12/2007 | Park et al. | |
| 2008/0044736 A1 | 2/2008 | Nakura | |
| 2008/0081258 A1 | 4/2008 | Kim et al. | |
| 2009/0117464 A1 | 5/2009 | Cho et al. | |
| 2009/0117469 A1 | 5/2009 | Hiratsuka et al. | |
| 2009/0148772 A1 | 6/2009 | Kawasato et al. | |
| 2009/0233176 A1 | 9/2009 | Kita et al. | |
| 2009/0286164 A1 | 11/2009 | Wada et al. | |
| 2009/0289218 A1 | 11/2009 | Kajiya et al. | |
| 2009/0299922 A1 | 12/2009 | Malcus et al. | |
| 2009/0305136 A1 | 12/2009 | Yada et al. | |
| 2010/0015514 A1 | 1/2010 | Miyagi et al. | |
| 2010/0019194 A1 | 1/2010 | Fujiwara et al. | |
| 2010/0112447 A1 | 5/2010 | Yamamoto et al. | |
| 2010/0136412 A1 | 6/2010 | Watanabe | |
| 2010/0143583 A1 | 6/2010 | Honda et al. | |
| 2010/0183922 A1 | 7/2010 | Cho et al. | |
| 2010/0196761 A1 | 8/2010 | Tatsumi et al. | |
| 2010/0209757 A1 | 8/2010 | Ooyama et al. | |
| 2010/0209771 A1 | 8/2010 | Shizuka et al. | |
| 2010/0227222 A1 | 9/2010 | Chang et al. | |
| 2011/0031437 A1 | 2/2011 | Nagase et al. | |
| 2011/0033749 A1 | 2/2011 | Uchida et al. | |
| 2011/0076558 A1 | 3/2011 | Miyazaki et al. | |
| 2011/0250499 A1 | 10/2011 | Hiratsuka | |
| 2012/0034525 A1 | 2/2012 | Satoh et al. | |
| 2012/0183855 A1 * | 7/2012 | Wohlfahrt-Mehrens | H01M 4/485 429/221 |
| 2012/0231342 A1 | 9/2012 | Satoh et al. | |
| 2012/0231343 A1 | 9/2012 | Nagase et al. | |
| 2012/0244434 A1 | 9/2012 | Nagase | |
| 2012/0292562 A1 | 11/2012 | Kajiya et al. | |
| 2012/0319036 A1 | 12/2012 | Kajiya et al. | |
| 2012/0319037 A1 | 12/2012 | Kawahashi et al. | |
| 2012/0319039 A1 | 12/2012 | Satoh et al. | |
| 2012/0319040 A1 | 12/2012 | Okamoto et al. | |
| 2012/0321956 A1 | 12/2012 | Kawahashi et al. | |
| 2012/0326080 A1 | 12/2012 | Okamoto et al. | |
| 2012/0326098 A1 | 12/2012 | Satoh | |
| 2012/0326099 A1 | 12/2012 | Satoh | |
| 2012/0326101 A1 | 12/2012 | Satoh | |
| 2012/0326102 A1 | 12/2012 | Satoh | |
| 2013/0001463 A1 | 1/2013 | Okamoto et al. | |
| 2013/0004849 A1 | 1/2013 | Satoh | |
| 2013/0043428 A1 | 2/2013 | Kawahashi et al. | |
| 2013/0108921 A1 | 5/2013 | Kase et al. | |
| 2013/0143121 A1 | 6/2013 | Kobayashi et al. | |
| 2013/0175470 A1 | 7/2013 | Kajiya et al. | |
| 2013/0216913 A1 * | 8/2013 | Tode | H01M 4/131 429/223 |
| 2013/0221271 A1 | 8/2013 | Nagase et al. | |
| 2013/0316239 A1 | 11/2013 | Okamoto | |
| 2013/0344386 A1 * | 12/2013 | Kim | H01M 4/525 429/221 |
| 2014/0306152 A1 | 10/2014 | Okamoto | |
| 2014/0339465 A1 | 11/2014 | Okamoto | |
| 2014/0339466 A1 | 11/2014 | Okamoto | |
| 2015/0123029 A1 | 5/2015 | Nagase et al. | |
| 2016/0233503 A1 | 8/2016 | Kobayashi et al. | |

FOREIGN PATENT DOCUMENTS

| | | |
|---|---|---|
| CN | 1710735 A | 12/2005 |
| CN | 1947288 A | 4/2007 |
| CN | 101478044 A | 7/2009 |
| EP | 0794155 A1 | 9/1997 |
| EP | 0903796 A1 | 3/1999 |
| EP | 1244164 A1 | 9/2002 |
| EP | 1317008 A2 | 6/2003 |
| EP | 1391950 A1 | 2/2004 |

(56) References Cited

FOREIGN PATENT DOCUMENTS

| | | |
|---|---|---|
| EP | 1450423 A1 | 8/2004 |
| EP | 1742281 A1 | 1/2007 |
| EP | 2023426 A1 | 2/2009 |
| EP | 2207226 A1 | 7/2010 |
| EP | 2207227 A1 | 7/2010 |
| EP | 2219251 A1 | 8/2010 |
| EP | 2533333 A1 | 12/2012 |
| EP | 2544272 A1 | 1/2013 |
| JP | 4-328277 A | 11/1992 |
| JP | 6-275274 A | 9/1994 |
| JP | 7-29603 A | 1/1995 |
| JP | 7-211311 A | 8/1995 |
| JP | 8-138669 A | 5/1996 |
| JP | 8-213015 A | 8/1996 |
| JP | 09-82325 A | 3/1997 |
| JP | 9-120813 A | 5/1997 |
| JP | 9-270257 A | 10/1997 |
| JP | 10-83815 A | 3/1998 |
| JP | 10-116618 A | 5/1998 |
| JP | 10-188986 A | 7/1998 |
| JP | 10-206322 A | 8/1998 |
| JP | 10-208744 A | 8/1998 |
| JP | 10-302779 A | 11/1998 |
| JP | 10-321224 A | 12/1998 |
| JP | 10-334919 A | 12/1998 |
| JP | 11-16573 A | 1/1999 |
| JP | 11-67205 A | 3/1999 |
| JP | 11-273676 A | 10/1999 |
| JP | 11-292542 A | 10/1999 |
| JP | 11-307094 A | 11/1999 |
| JP | 11-345615 A | 12/1999 |
| JP | 2000-30693 A | 1/2000 |
| JP | 2000-72445 A | 3/2000 |
| JP | 2000-149945 A | 5/2000 |
| JP | 2000-215884 A | 8/2000 |
| JP | 2000-348721 A | 12/2000 |
| JP | 2001-110420 A | 4/2001 |
| JP | 2001-148249 A | 5/2001 |
| JP | 2001-223008 A | 8/2001 |
| JP | 2001-266851 A | 9/2001 |
| JP | 2002-63901 A | 2/2002 |
| JP | 2002-124261 A | 4/2002 |
| JP | 3276183 B2 | 4/2002 |
| JP | 2002-164053 A | 6/2002 |
| JP | 2002-203552 A | 7/2002 |
| JP | 2002-216745 A | 8/2002 |
| JP | 2002-260655 A | 9/2002 |
| JP | 2002-289261 A | 10/2002 |
| JP | 2002-298914 A | 10/2002 |
| JP | 3334179 B2 | 10/2002 |
| JP | 2003-7299 A | 1/2003 |
| JP | 2003-17052 A | 1/2003 |
| JP | 2003048719 A | 2/2003 |
| JP | 2003-81637 A | 3/2003 |
| JP | 2003-151546 A | 5/2003 |
| JP | 2003-229129 A | 8/2003 |
| JP | 2004-6264 A | 1/2004 |
| JP | 2004-146374 A | 5/2004 |
| JP | 2004-172109 A | 6/2004 |
| JP | 2004-193115 A | 7/2004 |
| JP | 2004-214187 A | 7/2004 |
| JP | 3539223 B2 | 7/2004 |
| JP | 2004-227790 A | 8/2004 |
| JP | 2004-253169 A | 9/2004 |
| JP | 2004-273451 A | 9/2004 |
| JP | 2004-355824 A | 12/2004 |
| JP | 2004-356094 A | 12/2004 |
| JP | 2005-11713 A | 1/2005 |
| JP | 2005-44743 A | 2/2005 |
| JP | 2005-53764 A | 3/2005 |
| JP | 2005-56602 A | 3/2005 |
| JP | 2005-60162 A | 3/2005 |
| JP | 2005-75691 A | 3/2005 |
| JP | 2005-183366 A | 7/2005 |
| JP | 2005-225734 A | 8/2005 |
| JP | 2005-235624 A | 9/2005 |
| JP | 2005-243636 A | 9/2005 |
| JP | 2005-251700 A | 9/2005 |
| JP | 2005-285572 A | 10/2005 |
| JP | 2005-289700 A | 10/2005 |
| JP | 2005-302507 A | 10/2005 |
| JP | 2005-302628 A | 10/2005 |
| JP | 2005-324973 A | 11/2005 |
| JP | 2005-327644 A | 11/2005 |
| JP | 2005-332707 A | 12/2005 |
| JP | 2005-347134 A | 12/2005 |
| JP | 2006-4724 A | 1/2006 |
| JP | 2006-19229 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2006-127923 A | 5/2006 |
| JP | 2006-127955 A | 5/2006 |
| JP | 2006-134816 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-302542 A | 11/2006 |
| JP | 2006-351379 A | 12/2006 |
| JP | 2007-48744 A | 2/2007 |
| JP | 2007-95443 A | 4/2007 |
| JP | 2007-194202 A | 8/2007 |
| JP | 2007-214138 A | 8/2007 |
| JP | 2007-226969 A | 9/2007 |
| JP | 2007-227368 A | 9/2007 |
| JP | 2007-257890 A | 10/2007 |
| JP | 2007-280723 A | 10/2007 |
| JP | 2008-13405 A | 1/2008 |
| JP | 4070585 B2 | 4/2008 |
| JP | 2008-103132 A | 5/2008 |
| JP | 2008-181708 A | 8/2008 |
| JP | 2008-192547 A | 8/2008 |
| JP | 2008-266136 A | 11/2008 |
| JP | 2008-277106 A | 11/2008 |
| JP | 2008-282613 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |
| JP | 2009-151959 A | 7/2009 |
| JP | 4287901 B2 | 7/2009 |
| JP | 2009-289726 A | 12/2009 |
| JP | 2010-15959 A | 1/2010 |
| JP | 2010-47466 A | 3/2010 |
| JP | 2010-192200 A | 9/2010 |
| JP | 2011-44364 A | 3/2011 |
| JP | 2012-169224 A | 9/2012 |
| JP | 2012-243572 A | 12/2012 |
| JP | 2013-152911 A | 8/2013 |
| KR | 10-2010-0060362 A | 6/2010 |
| TW | 363940 | 7/1999 |
| WO | 02/086993 A1 | 10/2002 |
| WO | 03/003489 A1 | 1/2003 |
| WO | 2004/064180 A1 | 7/2004 |
| WO | 2007/072759 A1 | 6/2007 |
| WO | 2008/084679 A1 | 7/2008 |
| WO | 2009/011157 A1 | 1/2009 |
| WO | 2009/060603 A1 | 5/2009 |
| WO | 2009/063838 A1 | 5/2009 |
| WO | 2009/128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/007751 A1 | 1/2011 |
| WO | 2011/065391 A1 | 6/2011 |
| WO | 2011/108720 A1 | 9/2011 |
| WO | 2011/122448 A1 | 10/2011 |
| WO | 2012/098724 A1 | 7/2012 |

(56) References Cited

FOREIGN PATENT DOCUMENTS

| WO | 2012/132071 A1 | 10/2012 |
|---|---|---|
| WO | 2012/132072 A1 | 10/2012 |
| WO | 2012/157143 A1 | 11/2012 |

OTHER PUBLICATIONS

Final Rejection dated Feb. 24, 2015 in co-pending U.S. Appl. No. 13/695,663.
Final Rejection dated Feb. 27, 2015 in co-pending U.S. Appl. No. 13/581,730.
Office Action dated Feb. 26, 2015 in co-pending U.S. Appl. No. 13/582,101.
Office Action dated Feb. 26, 2015 in co-pending U.S. Appl. No. 13/582,113.
Office Action dated Dec. 4, 2013 in co-pending U.S. Appl. No. 13/508,880.
Final Rejection dated Jun. 18, 2014 in co-pending U.S. Appl. No. 13/508,880.
Office Action—Restriction—dated Mar. 12, 2013 in co-pending U.S. Appl. No. 13/508,887.
Office Action dated Jun. 10, 2013 in co-pending U.S. Appl. No. 13/508,887.
Final Rejection dated Sep. 19, 2013 in co-pending U.S. Appl. No. 13/508,887.
Office Action dated Sep. 17, 2013 in co-pending U.S. Appl. No. 13/856,514.
Final Rejection dated Feb. 27, 2014 in co-pending U.S. Appl. No. 13/856,514.
Office Action dated Jul. 16, 2013 in co-pending U.S. Appl. No. 13/514,080.
Office Action dated Dec. 18, 2013 in co-pending U.S. Appl. No. 13/514,080.
Final Rejection dated Jun. 3, 2014 in co-pending U.S. Appl. No. 13/514,080.
Office Action dated Jul. 29, 2013 in co-pending U.S. Appl. No. 13/576,548.
Final Rejection dated Jan. 9, 2014 in co-pending U.S. Appl. No. 13/576,548.
Office Action dated Jul. 1, 2014 in co-pending U.S. Appl. No. 13/576,548.
Office Action dated Jul. 8, 2014 in co-pending U.S. Appl. No. 13/576,753.
Office Action dated Aug. 1, 2013 in abandoned U.S. Appl. No. 13/581,546.
Final Rejection dated Jan. 27, 2014 in abandoned U.S. Appl. No. 13/581,546.
Office Action dated Aug. 13, 2013 in abandoned U.S. Appl. No. 13/582,067.
Final Rejection dated Jan. 24, 2014 in abandoned U.S. Appl. No. 13/582,067.
Office Action dated Jul. 17, 2013 in abandoned U.S. Appl. No. 13/581,814.
Final Rejection dated Jan. 27, 2014 in abandoned U.S. Appl. No. 13/581,814.
Office Action dated Jun. 19, 2013 in co-pending U.S. Appl. No. 13/582,096.
Final Rejection dated Feb. 20, 2014 in co-pending U.S. Appl. No. 13/582,096.
Office Action dated Jul. 12, 2013 in co-pending U.S. Appl. No. 13/582,101.
Final Rejection dated Feb. 7, 2014 in co-pending U.S. Appl. No. 13/582,101.
Office Action dated Jul. 15, 2013 in co-pending U.S. Appl. No. 13/582,113.
Final Rejection dated Feb. 18, 2014 in co-pending U.S. Appl. No. 13/582,113.
Office Action dated Nov. 14, 2014 in co-pending U.S. Appl. No. 13/582,096.

Notice of Allowance dated Jan. 15, 2015 in co-pending U.S. Appl. No. 13/514,080.
Final Rejection dated Jan. 23, 2015 in co-pending U.S. Appl. No. 13/576,548.
Final Rejection dated Jan. 28, 2015 in co-pending U.S. Appl. No. 13/576,753.
Office Action—Restriction—dated Jan. 26, 2015 in co-pending U.S. Appl. No. 13/581,423.
Final Rejection dated Feb. 12, 2015 in co-pending U.S. Appl. No. 13/582,089.
Final Rejection dated Feb. 13, 2015 in co-pending U.S. Appl. No. 13/582,087.
Journal of Power Sources, vol. 146, 2005, pp. 39-44, "Performance of LiNiCoO2 materials for advanced lithium-ion batteries", ITOU, et al.
Ceramics International, vol. 35, No. 4, May 2009, pp. 1633-1639, "Fine-sized LiNi0.8Co0.15Mn0.05O2 cathode particles prepared by spray pyrolysis from the polymeric precursor solutions", Ju, et al.
Journal of Alloys and Compounds, vol. 469, No. 1-2, Feb. 2009, pp. 304-309, "Effects of the ratio of manganese and nickel components on the characteristics of Lix(MnyNi1-y)Oz cathode powders prepared by spray pyrolysis", Ju, et al.
Journal of Power Sources, vol. 153, No. 2, Feb. 2006, pp. 345-349, "Improvement of 12V overcharge behavior of LiCoO2 cathode material by LiNi0.8Co0.1Mn0.1O2 addition in a Li-ion cell", Kim, et al.
Journal of Applied Electrochemistry, vol. 38, No. 5, Jan. 2008, pp. 613-617, "Comparative study of the preparation and electrochemical performance of LiNi1/2Mn1/2O2 electrode material for rechargeable lithium batteries", Lian, et al.
European Communication dated Jan. 5, 2015 in co-pending European patent application No. 11842456.3.
European Communication dated Dec. 9, 2014 in co-pending European patent application No. 11750768.1.
European Communication dated Dec. 9, 2014 in co-pending European patent application No. 11750762.4.
European Communication dated Feb. 17, 2015 in co-pending European patent application No. 11865511.7.
Chinese Communication dated Jan. 12, 2015 in co-pending Chinese patent application No. 201280004477.6.
International Search Report dated Jan. 7, 2014 in corresponding PCT application No. PCT/JP2013/076598.
Journal of the the Electrochemical Society, vol. 151, No. 10, Sep. 2004, pp. A1707-A1711, "Comparison of Overcharge Behavior of AlPO4-Coated LiCoO2 and LiNi0.8Co0.1Mn0.1O2 Cathode Materials in Li-Ion Cells", Cho, et al.
Electrochimica Acta, vol. 51, 2006, pp. 5581-5586, "Preparation and electrochemical properties of LiCoO2—LiNi0.5Mn0.5O2—Li2MnO3 solid solutions with high Mn contents", Sun, et al.
International Journal of Inorganic Materials 3 (2001), pp. 323-329, "Structural and electrochemical properties of Li—Ni—Co oxides synthesized by wet chemistry via a succinic-acid-assisted technique", Castro-Garcia, et al.
Int. J. Electrochem. Sci., vol. 4, 2009, pp. 1770-1778, "Improved High Rate Cycling of Li-rich Li(1.10)Ni(1/3)Co(1/3)Mn(1/3)O(2) Cathode for Lithium Batteries", Santhanam, et al.
International Search Report dated Dec. 25, 2012 in co-pending PCT application No. PCT/JP2012/074263.
International Search Report dated Dec. 25, 2012 in co-pending PCT application No. PCT/JP2012/074266.
International Search Report dated Aug. 27, 2013 in co-pending PCT application No. PCT/JP2013/064941.
Japanese communication dated Apr. 7, 2015 in co-pending Japanese patent application No. 2012-503258.
International Preliminary Report on Patentability dated Mar. 19, 2015 in co-pending PCT application No. PCT/JP2013/064941.
International Preliminary Report on Patentability dated Apr. 2, 2015 in corresponding PCT application No. PCT/JP2013/076598.
Wikipedia, Karl Fischer Titration article, Waybackmachine.com snapshot dtd., Sep. 12, 2010, 2 pages.
Office Action dated Mar. 25, 2015 in co-pending U.S. Appl. No. 13/581,423.

(56) References Cited

OTHER PUBLICATIONS

Office Action dated Mar. 18, 2015 in co-pending U.S. Appl. No. 13/816,822.
Office Action dated Apr. 3, 2015 in co-pending U.S. Appl. No. 13/822,447.
Office Action dated Apr. 23, 2015 in co-pending U.S. Appl. No. 14/364,795.
Office Action dated Apr. 3, 2015 in co-pending U.S. Appl. No. 14/364,809.
Office Action dated Apr. 3, 2015 in co-pending U.S. Appl. No. 14/364,830.
Office Action dated May 14, 2015 in co-pending U.S. Appl. No. 13/984,947.
Final Rejection dated Jul. 29, 2015 in co-pending U.S. Appl. No. 13/508,880.
Office Action dated Jun. 4, 2015 in co-pending U.S. Appl. No. 13/695,663.
Notice of Allowance dated Jun. 30, 2015 in co-pending U.S. Appl. No. 13/576,548.
Notice of Allowance dated May 20, 2015 in co-pending U.S. Appl. No. 13/582,087.
Final Rejection dated Jun. 23, 2015 in co-pending U.S. Appl. No. 13/582,096.
Final Rejection dated Jul. 1, 2015 in co-pending U.S. Appl. No. 13/582,101.
Final Rejection dated Jun. 30, 2015 in co-pending U.S. Appl. No. 13/582,113.
Final Rejection dated Jun. 24, 2015 in co-pending U.S. Appl. No. 13/816,822.
European communication dated Aug. 5, 2015 in co-pending European patent application No. EP 11750707.9.
Yamada, et al., "Synthesis and properties of LiNiO2 as cathode material for secondary batteries", Journal of Power Sources, vol. 54, No. 2, Apr. 1, 1995, pp. 209-213.
Whittingham, Stanley M., "Lithium Batteries and Cathode Materials", Chem. Rev. 2004, 104, 4271-4301.
Notice of Allowance dated Aug. 26, 2015 in co-pending U.S. Appl. No. 13/695,663.
Notice of Allowance dated Sep. 10, 2015 in co-pending U.S. Appl. No. 13/576,753.
Notice of Allowance dated Sep. 22, 2015 in co-pending U.S. Appl. No. 13/582,096.
Notice of Allowance dated Oct. 22, 2015 in co-pending U.S. Appl. No. 13/582,101.
Notice of Allowance dated Oct. 22, 2015 in co-pending U.S. Appl. No. 13/582,113.
Office action dated Sep. 29, 2015 in co-pending U.S. Appl. No. 13/816,822.
Final rejection dated Aug. 14, 2015 in co-pending U.S. Appl. No. 13/822,447.
Notice of Allowance dated Oct. 21, 2015 in co-pending U.S. Appl. No. 13/984,947.
Notice of Allowance dated Sep. 8, 2015 in co-pending U.S. Appl. No. 14/364,795.
Notice of Allowance dated Sep. 10, 2015 in co-pending U.S. Appl. No. 14/364,809.
Office action dated Sep. 8, 2015 in co-pending U.S. Appl. No. 14/364,830.
Office action dated Dec. 30, 2015 in co-pending U.S. Appl. No. 14/926,843.
Notice of Allowance dated Dec. 11, 2015 in co-pending U.S. Appl. No. 14/580,318.
Final rejection dated Nov. 4, 2015 in co-pending U.S. Appl. No. 13/581,423.
Conceicao, et al., "Combustion synthesis of (LSCF) porous materials for application as cathode in IT-SOFC", Materials Research Bulletin 46 (2011) p. 308-314.
Final rejection dated Jan. 20, 2016 in co-pending U.S. Appl. No. 13/816,822.
Vaisala Application Note, "Dew Point in Compressed Air—Frequently Asked Questions", 2013.
Notice of Allowance dated Mar. 2, 2016 in co-pending U.S. Appl. No. 13/581,423.
Final rejection dated Jan. 28, 2016 in co-pending U.S. Appl. No. 14/364,830.
International Search Report dated Jun. 8, 2010 in co-pending PCT application No. PCT/JP2010/053443.
International Preliminary Report on Patentability dated Nov. 17, 2011 in co-pending PCT application No. PCT/JP2010/053443.
International Search Report dated May 24, 2011 in co-pending PCT application No. PCT/JP2011/053271.
International Preliminary Report on Patentability dated Sep. 26, 2013 in co-pending PCT application No. PCT/JP2011/053271.
International Search Report/Written Opinion dated Mar. 8, 2011 in co-pending PCT application No. PCT/JP2010/071723.
International Preliminary Report on Patentability dated Jul. 12, 2012 in co-pending PCT application No. PCT/JP2010/071723.
International Search Report dated Jan. 24, 2012 in co-pending PCT application No. PCT/JP2011/072860.
International Preliminary Report on Patentability dated Oct. 10, 2013 in co-pending PCT application No. PCT/JP2011/072860.
International Search Report/Written Opinion dated Jan. 25, 2011 in co-pending PCT application No. PCT/JP2010/071724.
International Preliminary Report on Patentability dated Jul. 10, 2012 in co-pending PCT application No. PCT/JP2010/071724.
International Search Report dated Apr. 26, 2011 in co-pending PCT application No. PCT/JP2011/052394.
International Preliminary Report on Patentability dated Oct. 11, 2012 in co-pending PCT application No. PCT/JP2011/052394.
European communication dated May 9, 2014 in co-pending European patent application No. EP 11739870.1.
International Search Report dated May 10, 2011 in co-pending PCT application No. PCT/JP2011/052399.
International Preliminary Report on Patentability dated Oct. 11, 2012 in co-pending PCT application No. PCT/JP2011/052399.
International Search Report dated Nov. 15, 2011 in co-pending PCT application No. PCT/JP2011/069042.
International Preliminary Report on Patentability dated Aug. 1, 2013 in co-pending PCT application No. PCT/JP2011/069042.
International Search Report/Written Opinion dated Jun. 7, 2011 in co-pending PCT application No. PCT/JP2011/054935.
International Preliminary Report on Patentability dated Oct. 11, 2012 in co-pending PCT application No. PCT/JP2011/054935.
Japanese Communication dated Oct. 1, 2013 in co-pending Japanese patent application No. JP 2012-503253.
International Search Report dated Jun. 7, 2011 in co-pending PCT application No. PCT/JP2011/054938.
International Preliminary Report on Patentability dated Nov. 22, 2012 in co-pending PCT application No. PCT/JP2011/054938.
Japanese Communication dated Oct. 1, 2013 in co-pending Japanese patent application No. JP 2012-503255.
International Search Report/Written Opinion dated May 17, 2011 in co-pending PCT application No. PCT/JP2011/054942.
International Preliminary Report on Patentability dated Oct. 2, 2012 in co-pending PCT application No. PCT/JP2011/054942.
International Search Report/Written Opinion dated Jun. 7, 2011 in co-pending PCT application No. PCT/JP2011/054934.
International Preliminary Report on Patentability dated Oct. 11, 2012 in co-pending PCT application No. PCT/JP2011/054934.
Japanese Communication dated Oct. 1, 2013 in co-pending Japanese patent application No. JP 2012-503252.
International Search Report/Written Opinion dated May 17, 2011 in co-pending PCT application No. PCT/JP2011/054941.
International Preliminary Report on Patentability dated Oct. 2, 2012 in co-pending PCT application No. PCT/JP2011/054941.
International Search Report dated May 10, 2011 in co-pending PCT application No. PCT/JP2011/055111.
International Preliminary Report on Patentability dated Nov. 22, 2012 in co-pending PCT application No. PCT/JP2011/055111.
International Search Report/Written Opinion dated May 17, 2011 in co-pending PCT application No. PCT/JP2011/053710.

(56) References Cited

OTHER PUBLICATIONS

International Preliminary Report on Patentability dated Oct. 2, 2012 in co-pending PCT application No. PCT/JP2011/053710.
Chinese communication dated May 12, 2014 in co-pending Chinese patent application No. CN 201180008573.3.
International Search Report/Written Opinion dated May 24, 2011 in co-pending PCT application No. PCT/JP2011/054777.
International Preliminary Report on Patentability dated Oct. 2, 2012 in co-pending PCT application No. PCT/JP2011/054777.
European communication dated May 9, 2014 in co-pending European patent application No. EP 11750704.6.
International Search Report dated May 24, 2011 in co-pending PCT application No. PCT/JP2011/054781.
Written Opinion dated Jun. 24, 2011 in co-pending PCT application No. PCT/JP2011/054781.
International Preliminary Report on Patentability dated Oct. 11, 2012 in co-pending PCT application No. PCT/JP2011/054781.
International Search Report/Written Opinion dated May 24, 2011 in co-pending PCT application No. PCT/JP2011/054779.
International Preliminary Report on Patentability dated Oct. 2, 2012 in co-pending PCT application No. PCT/JP2011/054779.
European communication dated May 22, 2014 in co-pending European patent application No. EP 11750705.3.
International Search Report dated Nov. 1, 2011 in co-pending PCT application No. PCT/JP2011/066722.
International Preliminary Report on Patentability dated Jun. 13, 2013 in co-pending PCT application No. PCT/JP2011/066722.
European communication dated May 6, 2014 in co-pending European patent application No. EP 11845955.1.
International Search Report dated Apr. 10, 2012 in co-pending PCT application No. PCT/JP2011/079535.
International Search Report dated Jun. 5, 2012 in co-pending PCT application No. PCT/JP2012/057974.
International Preliminary Report on Patentability dated Oct. 10, 2013 in co-pending PCT application No. PCT/JP2012/057974.
International Preliminary Report on Patentability dated Jul. 31, 2014 in co-pending PCT application No. PCT/JP2012/074263.
International Preliminary Report on Patentability dated Jul. 31, 2014 in co-pending PCT application No. PCT/JP2012/074266.
Journal of the Electrochemical Society, 151 (11), 2004, pp. A1899-A1904, "Synthesis, Thermal, and Electrochemical Properties of AlPO4-Coated LiNi0.8Co0.1Mn0.1O2 Cathode Materials for Li-Ion Cell", Cho, et al.
Journal of the Electrochemical Society, 155 (3), 2008, pp. A239-A245, "Storage Characteristics of LiNi0.8Co0.1+Mn0.1-xO2 (X=0, 0.03, and 0.06) Cathode Materials for Lithium Ion Batteries", EOM, et al.
Machine English Translation for CN 1710735 (2005), 9 pages, European Patent Office, http://translationportal.epo.org . . . , retrieved from the internet Oct. 6, 2014.
Final Rejection dated Sep. 18, 2014 in co-pending U.S. Appl. No. 13/508,887.
Office Action dated Sep. 18, 2014 in co-pending U.S. Appl. No. 13/856,514.
Office Action dated Oct. 9, 2014 in co-pending U.S. Appl. No. 13/695,663.
Office Action dated Sep. 9, 2014 in co-pending U.S. Appl. No. 13/514,080.
Office Action dated Oct. 2, 2014 in co-pending U.S. Appl. No. 13/582,089.
Office Action dated Oct. 3, 2014 in co-pending U.S. Appl. No. 13/581,730.
Office Action dated Nov. 5, 2014 in co-pending U.S. Appl. No. 13/582,087.
European communication dated Oct. 27, 2014 in co-pending European patent application No. EP 10839166.5.
European communication dated Nov. 5, 2014 in co-pending European patent application No. EP 11856183.6.
European communication dated Oct. 20, 2014 in co-pending European patent application No. EP 12763420.2.

* cited by examiner

CATHODE ACTIVE MATERIAL FOR LITHIUM-ION BATTERY, CATHODE FOR LITHIUM-ION BATTERY AND LITHIUM-ION BATTERY

TECHNICAL FIELD

The present invention relates to a cathode active material for lithium-ion battery, a cathode for lithium-ion battery and a lithium-ion battery.

BACKGROUND ART

As a cathode active material for lithium-ion battery, a lithium-containing transition metal oxide is generally used. Specifically, lithium cobaltate ($LiCoO_2$), lithium nickelate ($LiNiO_2$), lithium manganate ($LiMn_2O_4$) or the like is used and compositing these materials has been promoted in order to improve characteristics (enhancement of capacity, cycle characteristics, storage characteristics, decrease of internal resistance, rate characteristics) and in order to enhance safety. Different characteristics are required for the lithium-ion batteries for use in large size applications such as automotive use and load leveling use from characteristics required for the lithium-ion batteries for use in cellular phones and personal computers.

The cycle characteristics of a battery, which are good, are beneficial in that decrease of the battery capacity caused by charge-discharge of the lithium-ion battery is small, and therefore life thereof is prolonged. In recent years, the cycle characteristics have been known to have close relation to generation of crack of the cathode active material particles associated with charge-discharge of the battery (Non Patent Literature 1). The generation of crack of the cathode active material particles causes increase in the resistance within the electrode and consumption of Li due to a side reaction thereof associated with the increased specific surface area, thereby resulting in lowered capacity at discharge.

To such a problem, Patent Literature 1, for example, discloses a lithium secondary battery comprising a substance, as a cathode active material, which contains a lithium-transition metal composite oxide expressed by general formula: $Li_XM_YO_{Z-\delta}$, wherein M represents Co or Ni being a transition metal element and relationships (X/Y) =0.98 to 1.02 and ($\delta$/Z)≤0.03 are satisfied, and also vanadium (V) and/or boron (B) in an amount of ((V+B)/M) =0.001 to 0.05 (molar ratio) based on the transition metal element (M) constituting the lithium transition metal composite oxide, the substance having a primary particle diameter of 1 μm or more, a crystallite size of 450 Å or more and a lattice distortion of 0.05% or less. Patent Literature 1 states that a lithium secondary battery can be provided, which has low internal resistance, high output and high capacity and also exhibits excellent charge-discharge cycle characteristics even under a high-temperature condition.

In addition, Patent Literature 2 discloses a nonaqueous solvent secondary battery employing a hexagonal crystal $LiCoO_2$ as the cathode active material, the $LiCoO_2$ crystal having a lattice constant of the c axis of 14.05 to 14.15 Å and a crystallite size in the (110) surface direction of 350 to 400 Å and that in the (003) surface direction of 260 to 300 Å. Patent Literature 2 states that a nonaqueous solvent secondary battery can be provided, which has reduced capacity deterioration caused by charge-discharge cycles.

Further, Patent Literature 3 discloses a fluorine-containing lithium-cobalt based composite oxide which has a crystallite size in the (110) vector direction of 950 Å or less, an amount of soluble fluorine atoms of 2000 ppm or less, and an F/Co atomic ratio of 0.01 or less. Patent Literature 3 states that the cycle characteristics of a lithium-ion secondary battery are improved.

CITATION LIST

Patent Literature

[Patent Literature 1]
Japanese Patent Laid-Open No. 2004-253169
[Patent Literature 2]
Japanese Patent No. 3276183
[Patent Literature 3]
Japanese Patent Laid-Open No. 2005-225734

Non Patent Literature

[Non Patent Literature 1]
Y. Itou et. al., Journal of Power Sources 146, 39-44 (2005)

SUMMARY OF INVENTION

Technical Problem

However, although the effect of the invention is attained by introducing vanadium and/or boron into the cathode active material in Patent Literature 1, the vanadium and/or boron are not incorporated into the crystal structure as evidenced by the description in the paragraph 0051 of the specification in Patent Literature 1, which describes "In the present invention, calcination is not carried out in a manner in which the vanadium compound including vanadium and/or the boron compound including boron are added to the salt and/or oxide of each element constituting the above-described lithium-transition metal composite oxide (i.e., raw material compounds), and then the mixture is calcined, but the raw material compounds only are once calcined to give a lithium-transition metal composite oxide, and then the vanadium compound and/or the boron compound are added to the composite oxide followed by calcination. These procedures can prevent incorporation of the vanadium and/or boron into the structure of the lithium-transition metal composite oxide, and therefore produce the cathode active material in which sufficient capacity is secured as the cathode active material." Therefore, the cathode active material is not composed of a single phase compound and requires two or more of calcination steps, thereby being disadvantageous in terms of the production efficiency. In addition, due to such constitution, there also exists restriction which is that the crystallite size cannot be sufficiently large unless the vanadium or boron is added in an amount exceeding a certain ratio. The cathode active material described in Patent Literature 2 has a small crystallite size, and therefore it has been made clear through the investigation by the present inventors that a crack area becomes larger when cracking happens within the crystal grains, thereby causing various problems. The philosophy of the invention described in Patent Literature 3 also intends to decrease the crystallite size, thereby causing the same problems as Patent Literature 2.

An object of the present invention is to provide a novel cathode active material for lithium-ion battery which suppresses the generation of crack of the cathode active material particles associated with charge-discharge of the battery and provides good battery characteristics such as cycle characteristics.

Solution to Problem

As a result of intensive studies, the present inventors have found that when a cathode active material for lithium-ion battery is composed of a predetermined composition and the crystallite size obtained by analyzing the XRD pattern is controlled in a predetermined range, the generation of crack of the cathode active material particles associated with charge-discharge of the battery can be reduced, thereby improving the cycle characteristics.

In one aspect, the present invention accomplished based on the above-described finding is a cathode active material for lithium-ion battery expressed by the composition formula:

$$Li_xNi_{1-y}M_yO_\alpha,$$

wherein M is one or more selected from Ti, Cr, Mn, Fe, Co, Cu, Al, Sn, Mg and Zr; 0.9≤x≤1.2; 0<y≤0.5; and 2.0≤α≤2.2, wherein the crystallite size obtained by analyzing the XRD pattern is 870 Å or more and the unit lattice volume is 101.70 Å³ or less.

In one embodiment, in the cathode active material for lithium-ion battery according to the present invention, the crystallite size obtained by analyzing the XRD pattern is 930 Å or more.

In yet another embodiment, in the cathode active material for lithium-ion battery according to the present invention, the crystallite size obtained by analyzing the XRD pattern is 930 to 1100 Å.

In yet another embodiment, in the cathode active material for lithium-ion battery according to the present invention, M is one or more selected from Mn and Co.

In another aspect, the present invention is a cathode for lithium-ion battery comprising the cathode active material for lithium-ion battery according to the present invention.

In yet another aspect, the present invention is a lithium-ion battery comprising the cathode for lithium-ion battery according to the present invention.

Advantageous Effect of Invention

According to the present invention, a cathode active material for lithium-ion battery can be provided, which provides good battery characteristics such as cycle characteristics.

DESCRIPTION OF EMBODIMENTS (Constitution of the Cathode Active Materials for Lithium-Ion Battery)

As a material for the cathode active material for lithium-ion battery according to the present invention, commonly used compounds useful as a cathode active material for lithium-ion battery can be used, and particularly a lithium-containing transition metal oxide such as lithium cobaltate ($LiCoO_2$), lithium nickelate ($LiNiO_2$) or lithium manganate ($LiMn_2O_4$) is preferably used. A cathode active material for lithium-ion battery according to the present invention prepared using such a material is expressed by the composition formula:

$$Li_xNi_{1-y}M_yO_\alpha,$$

wherein M is one or more selected from Ti, Cr, Mn, Fe, Co, Cu, Al, Sn, Mg and Zr; 0.9≤x≤1.2; 0<y≤0.5; and 2.0≤α≤2.2.

In addition, M is preferably one or more selected from Mn and Co.

When the present inventors observed the situation of an electrode of a lithium-ion battery upon repeated charge-discharge cycles by cross-sectional SEM, crack generation between and within the crystal grains was recognized after 50 cycles (charge voltage of 4.25 V). It is believed that these cracks cause increase in the internal resistance of the battery and a reaction between the electrolyte and Li on the surface of the particles, thereby reducing the capacity at discharge to result in deterioration of the cycle characteristics.

In contrast, in the cathode active material for lithium-ion battery according to the present invention, the crystallite size obtained by analyzing the XRD pattern is controlled to be 870 Å or more.

A crystallite is the minimum unit contributing to diffraction and refers to a portion that can be regarded as a single crystal in a crystal grain, and a crystallite size represents a single crystal domain size within the crystal. As methods for calculating the crystallite size, observation by a transmission electron microscope (TEM) and analysis of the X-ray diffraction data (XRD pattern) are used. Although with the TEM the crystallites can be directly observed, the observation area is too small to obtain the average information. The X-ray diffraction method is, on the other hand, very useful because the average information of the irradiated area with X-ray can be obtained.

Figure 1:
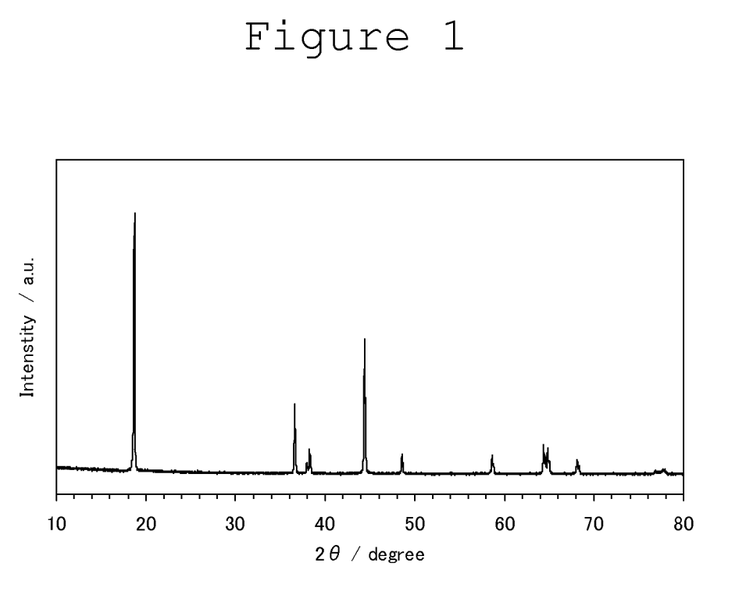
FIG. 1 shows a pattern obtained by powder X-ray diffraction of a cathode active material for lithium-ion battery.

The crystallite size is calculated using the Williamson-Hall method. The Williamson-Hall method is a method to calculate the crystallite size from the peak angles in the pattern (FIG. 1) obtained by powder X-ray diffraction or the like. The spread of the diffraction line is mainly derived from the crystallite size and the lattice distortion except for that derived from the instrument. Assuming that the spread derived from the crystallite size is proportional to 1/cos θ and the spread due to the distortion is proportional to tan θ, the crystallite size is determined using the relational expression shown below:

$$\beta = K\lambda/(D \cos\theta) + 2\epsilon \tan\theta,$$

wherein β is peak width, D is crystallite size, K is Scherrer constant, λ is wavelength, and ε is distortion.

The cracking of the cathode active material upon the charge-discharge cycles is thought to be caused by the stress in the intercrystalline boundaries generated by expansion and contraction of the crystals. Provided that cathode active materials of the same amount are present, the relative amount of the intercrystalline boundaries for the cathode active material having the larger crystallite size is relatively decreased comparing with that for the cathode active material having the smaller crystallite size. In the cathode active material for lithium-ion battery according to the present invention, cracking of the cathode active material is reduced because the crystallite size obtained by analyzing the XRD pattern is controlled to be 870 Å or more. This results in the reduced effects of the cracking which is thought to adversely affect the cycle characteristics, and thus reduction of the cycle characteristics can be prevented.

Figure 2:
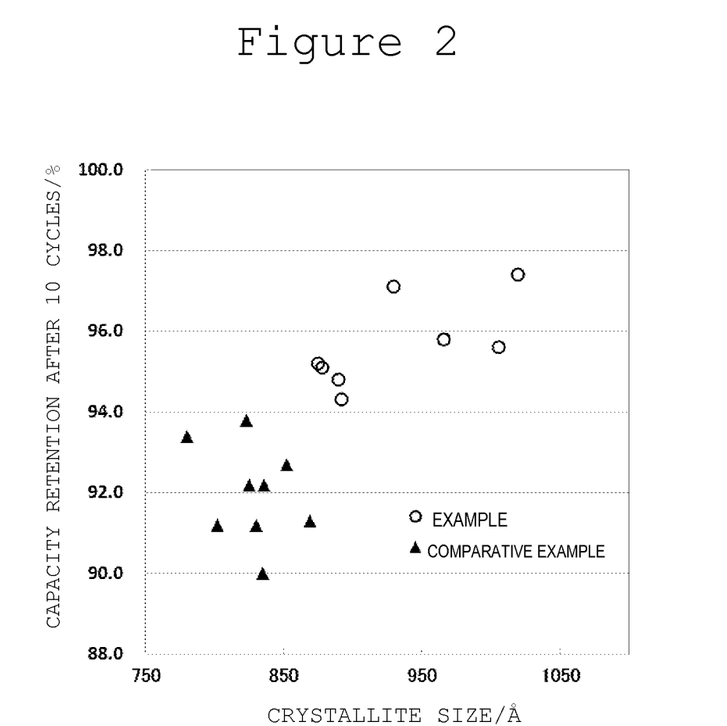
FIG. 2 shows a relationship between the capacity retention of the battery after 10 cycles of charge-discharge and the crystallite size of the cathode active material for lithium-ion battery for each of Examples and Comparative Examples.

In FIG. 2, there is shown the relationship between the capacity retention after 10 cycles of charge-discharge and the crystallite sizes obtained in Examples and Comparative Examples described later. The capacity retention after 10 cycles shows a sharp decline when the crystallite size is below 870 Å. The capacity retention is increased when the crystallite size is 870 Å or more. These indicate that the crystallite size calculated from the XRD pattern significantly affects the cycle characteristics of the battery. It is believed that increasing the crystallite size decreases the crack area upon generation of the crack within the crystal grains, thereby reducing increase in the resistance and increase in the specific surface area described above to result in suppression of the reduction of the cycle characteristics.

The crystallite size obtained by analyzing the XRD pattern is preferably 930 Å or more, and more preferably 930 to 1100 Å.

In addition, in the cathode active material for lithium-ion battery according to the present invention, the unit lattice volume is 101.70 Å³ or less. The unit lattice volume is calculated from the lattice constants determined from the XRD pattern. The lattice constants are refined by employing a procedure in which the reciprocal lattice constants are determined from the representative peaks in the XRD pattern and the spacing through the least-squares method. For the calculation thereof, an analytical software "PDXL" (Rigaku Corporation) can be used. The principle of the calculation will be shown below.

The lattice spacing d and the reciprocal lattice constants satisfy the following relationship:

$$\frac{1}{d^2} = h^2 x_1 + k^2 x_2 + l^2 x_3 + kl x_4 + lh x_5 + hk x_6 \quad \text{[Expression 1]}$$

$$x_1 = a^{*2},$$
$$x_2 = b^{*2}, \quad \text{[Expression 2]}$$
$$x_3 = c^{*2},$$
$$x_4 = 2b^* c^* \cos\alpha^*,$$
$$x_5 = 2c^* a^* \cos\beta^*,$$
$$x_6 = 2a^* b^* \cos\gamma^*$$

Using these Expressions, x1 to x6 minimizing the residual sum of squares (Expression below) of $1/d_0^2$ ($d_0$: observed value of lattice spacing) and $1/d^2$ calculated using the above Expressions are calculated to determine the reciprocal lattice constants.

$$\sum_i w_i \left[ \frac{1}{d_0^2} - \frac{1}{d^2} \right] \quad \text{[Expression 3]}$$

Furthermore, the lattice constants are determined through the relationship between the reciprocal lattice constants and the lattice constants. Although a weight function w (e.g., $\sin^2 2\theta$) may be used in some cases in order to emphasize the diffraction lines on the higher angle side, w is set at 1 in the calculations here.

The cathode active material according to the present invention has a rhombohedral structure of R-3m and the lattice constants are determined by the calculations described above using the d values for the peaks derived from 9 crystal planes in total of (003), (101), (012), (104), (015), (107), (018), (110) and (113) having relatively high intensity in the XRD measuring range (2 θ=10 to 80°).

Lengths of the a axis, b axis and c axis, which are lattice constants, are determined by the method described above, and then the unit lattice volume is determined by the calculation formula:

$$V = \sqrt{3}/2 \times a \times b \times c \quad (V\text{: unit lattice volume, } a, b, c\text{: lattice constant in each axis}),$$

since the cathode active material according to the present invention has a rhombohedral structure of R-3m.

The state of Li introduction into the active material can be adjusted by controlling the unit lattice volume, and particularly the state can be adjusted to that in which Li is suitably packed in the lattice by controlling the unit lattice volume to be 101.70 Å³ or less, thereby being able to improve the battery characteristics. The unit lattice volume is preferably 101.60 Å³ or less, and more preferably 101.50 Å³ or less. There is no need to limit the minimum but the unit lattice volume is typically 101.40 Å³ or more.

(Constitution of the Cathode for Lithium-Ion Battery and the Lithium-Ion Battery Using the Same)

The cathode for lithium-ion battery according to an embodiment of the present invention, for example, has a structure in which a cathode mixture prepared by mixing the cathode active material for lithium-ion battery having the constitution described above, an electrical conductivity auxiliary and a binder is provided on a single surface or both surfaces of an electric collector composed of aluminum foil or the like. In addition, the lithium-ion battery according to an embodiment of the present invention comprises a cathode for lithium-ion battery having such constitution.

(A Method for Producing the Cathode Active Material for Lithium-Ion Battery)

Then, a method for producing the cathode active material for lithium-ion battery according to an embodiment of the present invention will be described in detail.

First, a solution of metal salts is prepared. The above-described metals are Ni and one or more selected from Ti, Cr, Mn, Fe, Co, Cu, Al, Sn, Mg and Zr. The metal salts are sulfates, chlorides, nitrates, acetates or the like, and particularly nitrates are preferred. This is because when nitrates are mixed into a material for calcination as impurities, the material can be calcined as it is, and therefore a washing step can be omitted, and further nitrates function as oxidants to serve to promote oxidation of the metals in the material for calcination. Each metal contained in the metal salts is adjusted in advance so that these metals are present in a desired molar ratio. This adjustment determines the molar ratio of each metal in the resulting cathode active material. In addition, the crystallite size of the cathode active material can become larger by increasing the ratio of Li and the other metals (Me), Li/Me, in the solution of metal salts.

Then, lithium carbonate is suspended in pure water, and subsequently the solution of metal salts of the above-described metals is poured into the lithium carbonate suspension to form a metal carbonate slurry. Then, a lithium-containing carbonate is precipitated in the form of fine particles in the slurry. It is noted that when the metal salts are used whose lithium compounds do not react during heat treatment, for example, metal sulfates or chlorides, the lithium-containing carbonate is washed with a saturated lithium carbonate solution, followed by separation by filtration. When the metal salts are used whose lithium compounds do react during heat treatment to form starting lithium materials, for example, metal nitrates or acetates, the lithium-containing carbonate can be separated by filtration as it is without washing, and dried for use as a precursor to be calcined.

The lithium-containing carbonate separated by filtration is then dried to give a powdery composite of lithium salt (cathode active material precursor for lithium-ion battery).

Then, a calcination container having a predetermined capacity is provided and the calcination container is filled with the powdery precursor for lithium-ion battery cathode active material. The calcination container filled with the powdery cathode active material precursor for lithium-ion battery is then transferred to a calcination furnace and calcination is carried out. The calcination is performed by heating and holding the precursor for a predetermined period of time under oxygen atmosphere or under air atmosphere. In the calcination, the temperature is raised from room temperature up to 880 to 1000° C. (calcination temperature) in 2 to 3 hours (heat-up time), and then the precursor is heated and held for 3 to 4 hours. Subsequently, the temperature is lowered to room temperature in 2 to 3 hours (cooling time). Under these calcination conditions, the crystallite size of the cathode active material can be grown largely by suitably controlling the calcination temperature, by shortening the cooling time from the calcination temperature to room temperature (enhancing the cooling rate), and further by shortening the heat-up time from room temperature to the calcination temperature (enhancing the heat-up rate), as described above. In addition, under these calcination conditions, the unit lattice volume can be controlled by suitably controlling the calcination temperature, and further by shortening the cooling time from the calcination temperature to room temperature (enhancing the cooling rate), as described above.

EXAMPLES

Hereinafter, Examples will be provided for better understanding of the present invention and advantages thereof but the present invention is not intended to be limited to these Examples.

Examples 1 to 8

First, lithium carbonate of a predetermined amount to be input was suspended in pure water, and then each solution of metal salts was poured into the lithium carbonate suspension so as to attain each composition ratio described in Table 1.

A lithium-containing carbonate in fine particles was precipitated in the solution through this treatment, and then the precipitated material was separated by filtration using a filter press.

Subsequently, the precipitated material was dried to give a lithium-containing carbonate (cathode active material precursor for lithium-ion battery).

Then, a calcination container was provided and filled with the lithium-containing carbonate. The calcination container was then heated under each calcination atmosphere at each calcination temperature in each heat-up time, as described in Table 1. Subsequently, the temperature was lowered to room temperature in each cooling time described in Table 1, and then the calcined product was disintegrated to give a powdery cathode active material for lithium-ion secondary battery.

Comparative Examples 1 to 12

As Comparative Examples 1 to 12, each raw material metal was combined in each composition described in Table 1, calcination conditions for each Comparative Example were set to the values described in Table 1 and the same treatments as to those in Examples 1 to 8 were carried out.
(Evaluation)
—Evaluation of the Cathode Active Material Compositions—

The metal contents in each cathode active material were determined by an inductively coupled plasma optical-emission spectrometer (ICP-OES), thereby calculating the composition ratio for each metal (molar ratio). The composition ratio for each metal was confirmed to be as described in Table 1. In addition, each oxygen content was determined by the LECO method, and then each a was calculated.
—Evaluation of the Crystallite Sizes—

The crystallite size was evaluated by analyzing the XRD pattern determined by a powder X-ray diffraction instrument using the Williamson-Hall method. More specifically, each crystallite size was calculated by analyzing the XRD measurement data determined in the range of $2\theta=10$ to $80°$ by a powder X-ray diffraction instrument "SmartLab" (Rigaku Corporation) using a Cu target as the radiation source, using analytical software "PDXL" (Rigaku Corporation).
—Evaluation of the Unit Lattice Volumes—

Each unit lattice volume was calculated from the lattice constants determined from the XRD diffraction pattern. The lattice constants were refined by employing a method determining the reciprocal lattice from the representative peaks in the XRD pattern and the spacing through the least-squares method. Each unit lattice volume was calculated by the calculation formula:

$$V=\sqrt{3}/2 \times a \times b \times c \ (V: \text{unit lattice volume}, a, b, c: \text{lattice constant in each axis}),$$

using analytical software "PDXL" (Rigaku Corporation).
—Evaluation of the Battery Characteristics (Cycle Characteristics)—

Each cathode active material, an electrically conductive material and a binder were weighed in the ratio of 90:5:5, the cathode active material and the electrically conductive material were mixed in a solution prepared by dissolving the binder in an organic solvent (N-methylpyrrolidone) for slurrying, the slurry was coated on an Al foil followed by drying, and then the dried material was pressed to form each cathode. Subsequently, each 2030 type coin cell for evaluation was formed, in which the counter electrode was Li, and then the cycle characteristics (capacity retention) were determined using a solution prepared by dissolving 1 M-LiPF$_6$ in EC-DMC (1:1) as the electrolyte, by comparing the initial discharge capacity obtained from the discharge current at 1 C at room temperature and the discharge capacity after 10 cycles.

These results are shown in Table 1.

TABLE 1

| | Composition ratio of each metal based on total metals excluding Li | | | | | | Li/metals other than Li | Li-containing precursor used | Calcination temperature (° C.) | Heat-up time (room temperature → calcination temperature) | Cooling time (calcination temperature → room temperature) | x | y | α | Crystallite size (Å) | Unit lattice volume (Å$^3$) | Capacity retention after 10 cycles (%) |
|---|---|---|---|---|---|---|---|---|---|---|---|---|---|---|---|---|---|
| | Ni | Co | Mn | Ti | Al | Mg | | | | | | | | | | | |
| Example 1 | 80 | 10 | 10 | | | | 1.005 | Li2CO3 | 890 | 3 h | 3 h | 1.0 | 0.20 | 2.0 | 875 | 101.68 | 95.2 |
| Example 2 | 80 | 10 | 10 | | | | 1.005 | Li2CO3 | 880 | 3 h | 3 h | 1.0 | 0.20 | 2.0 | 890 | 101.65 | 94.8 |
| Example 3 | 80 | 10 | 10 | | | | 1.010 | Li2CO3 | 890 | 3 h | 3 h | 1.0 | 0.20 | 2.0 | 930 | 101.50 | 97.1 |
| Example 4 | 80 | 10 | 10 | | | | 1.015 | Li2CO3 | 910 | 3 h | 3 h | 1.0 | 0.20 | 2.0 | 1006 | 101.52 | 95.6 |
| Example 5 | 80 | 10 | 10 | | | | 1.025 | Li2CO3 | 910 | 3 h | 3 h | 1.0 | 0.20 | 2.0 | 966 | 101.45 | 95.8 |

TABLE 1-continued

| | Composition ratio of each metal based on total metals excluding Li | | | | | | Li/ metals other than Li | Li-containing precursor used | Calcination temperature (° C.) | Heat-up time (room temperature → calcination temperature) | Cooling time (calcination temperature → room temperature) | x | y | α | Crystallite size (Å) | Unit lattice volume (Å³) | Capacity retention after 10 cycles (%) |
|---|---|---|---|---|---|---|---|---|---|---|---|---|---|---|---|---|---|
| | Ni | Co | Mn | Ti | Al | Mg | | | | | | | | | | | |
| Example 6 | 80 | 15 | | | 2.5 | | 2.5 | 1.010 | Li2CO3 | 900 | 3 h | 3 h | 1.0 | 0.20 | 2.0 | 878 | 101.52 | 95.1 |
| Example 7 | 80 | 15 | | | 5 | | 1.010 | Li2CO3 | 920 | 3 h | 3 h | 1.0 | 0.20 | 2.0 | 892 | 101.54 | 94.3 |
| Example 8 | 50 | 20 | 30 | | | | 1.040 | Li2CO3 | 970 | 3 h | 3 h | 1.0 | 0.50 | 2.0 | 1020 | 101.52 | 97.4 |
| Comparative Example 1 | 80 | 10 | 10 | | | | 0.990 | Li2CO3 | 880 | 3 h | 3 h | 1.0 | 0.20 | 2.0 | 835 | 101.87 | 90.0 |
| Comparative Example 2 | 80 | 10 | 10 | | | | 0.990 | Li2CO3 | 910 | 3 h | 3 h | 1.0 | 0.20 | 2.0 | 852 | 101.85 | 92.7 |
| Comparative Example 3 | 80 | 10 | 10 | | | | 1.000 | Li2CO3 | 880 | 3 h | 3 h | 1.0 | 0.20 | 2.0 | 869 | 101.76 | 91.3 |
| Comparative Example 4 | 80 | 10 | 10 | | | | 1.010 | Li2CO3 | 890 | 4 h | 3 h | 1.0 | 0.20 | 2.0 | 836 | 101.72 | 92.2 |
| Comparative Example 6 | 50 | 20 | 30 | | | | 1.040 | Li2CO3 | 920 | 3 h | 3 h | 1.0 | 0.50 | 2.0 | 825 | 101.71 | 92.2 |
| Comparative Example 8 | 80 | 10 | 10 | | | | 1.005 | LiOH | 880 | 3 h | 3 h | 1.0 | 0.20 | 2.0 | 742 | 101.91 | 87.5 |
| Comparative Example 9 | 80 | 10 | 10 | | | | 1.005 | Li2CO3 | 880 | 3 h | 4 h | 1.0 | 0.20 | 2.0 | 830 | 101.78 | 91.2 |
| Comparative Example 10 | 50 | 20 | 30 | | | | 1.060 | LiOH | 970 | 3 h | 3 h | 1.1 | 0.50 | 2.0 | 780 | 101.75 | 93.4 |
| Comparative Example 11 | 50 | 20 | 30 | | | | 0.990 | Li2CO3 | 970 | 3 h | 3 h | 1.0 | 0.50 | 2.0 | 802 | 101.79 | 91.2 |
| Comparative Example 12 | 50 | 20 | 30 | | | | 1.060 | Li2CO3 | 970 | 4.5 h | 3 h | 1.1 | 0.50 | 2.0 | 823 | 101.73 | 93.8 |

(Evaluation Results)

Any of Examples 1 to 8 gave good cycle characteristics. It is noted that although investigation was carried out for Ti, Mn, Co, Al and Mg as M in the composition formula: $Li_xNi_{1-y}M_yO_\alpha$ expressing the cathode active material according to the present invention in Examples 1 to 8, the same results are also expected to be obtained for use of Cr, Fe, Sn, Cu and Zr as M.

Comparative Examples 1 to 12 had small crystallite sizes of less than 870 Å and the unit lattice volumes exceeding 101.70 Å³ and exhibited poor cycle characteristics.

FIG. 2 shows the relationship between the capacity retention after 10 cycles of charge-discharge and the crystallite sizes obtained in Examples and Comparative Examples.

The invention claimed is:

1. A cathode active material for lithium-ion battery expressed by the composition formula:

$Li_xNi_{1-y}M_yO_\alpha$, wherein M is any one of (1)-(3);
(1) Co and Mn;
(2) Co, Ti and Mg;
(3) Co and Al,
wherein $0.9 \leq x \leq 1.2$; $0 < y \leq 0.5$; and $2.0 \leq \alpha \leq 2.2$,
wherein the crystallite size obtained by analyzing the XRD pattern and calculated using the Williamson-Hall method is 930 Å to 1100 Å and the unit lattice volume is 101.70 Å³ or less.

2. A cathode for lithium-ion battery comprising a cathode active material for lithium-ion battery according to claim 1.

3. A lithium-ion battery comprising a cathode for lithium-ion battery according to claim 2.

* * * * *